(12) United States Patent
Seysen

(10) Patent No.: US 7,227,947 B2
(45) Date of Patent: Jun. 5, 2007

(54) CRYPTOGRAPHIC METHOD AND CRYPTOGRAPHIC DEVICE

(75) Inventor: Martin Seysen, München (DE)

(73) Assignee: Giesecke & Devrient GmbH, Munich (DE)

( * ) Notice: Subject to any disclaimer, the term of this patent is extended or adjusted under 35 U.S.C. 154(b) by 685 days.

(21) Appl. No.: 10/275,947

(22) PCT Filed: May 15, 2001

(86) PCT No.: PCT/EP01/05532

§ 371 (c)(1),
(2), (4) Date: Jun. 3, 2003

(87) PCT Pub. No.: WO01/88693

PCT Pub. Date: Nov. 22, 2001

(65) Prior Publication Data

US 2004/0028221 A1 Feb. 12, 2004

(30) Foreign Application Priority Data

May 17, 2000 (DE) .............................. 100 24 325

(51) Int. Cl.
*H04L 9/00* (2006.01)

(52) U.S. Cl. ............................................. 380/30; 380/1
(58) Field of Classification Search .................... None
See application file for complete search history.

(56) References Cited

U.S. PATENT DOCUMENTS 5,991,415 A 11/1999 Shamir

FOREIGN PATENT DOCUMENTS

GB 2318892 5/1998
WO WO-9852319 11/1998

OTHER PUBLICATIONS

Boneh D. et al. "On the Importance of Checking Cryptographic Protocols for Faults", Advances in Cryptology—Eurocrypt. International Conference on the Theory and Application of Cryptographic Techniques, Springer Verlag, DE, May 11, 1997, Selten 37-51, XP000775761 in der Anmeldung erwähnt Seite 49, Absatz 3.

*Primary Examiner*—Gilberto Barron, Jr.
*Assistant Examiner*—Kristin D. Sandoval
(74) *Attorney, Agent, or Firm*—Bacon & Thomas, PLLC

(57) ABSTRACT

The invention relates to a cryptographic method with at least one computing step containing a modular exponentiation E according to $E=x^d \pmod{p \cdot q}$, with a first prime factor p, a second prime factor q, an exponent d and a number x, whereby the modular exponentiation E is calculated according to the Chinese Remainder Theorem.

24 Claims, No Drawings

CRYPTOGRAPHIC METHOD AND CRYPTOGRAPHIC DEVICE

Cryptographic methods in the form of encryption and signature schemes are becoming increasingly widespread in particular due to the rising importance of electronic commerce. They are normally implemented by means of electronic apparatuses which may comprise for example a programmable universal microcontroller or else a specialized electronic circuit e.g. in the form of an ASIC. An especially interesting form of cryptographic apparatus is the smart card, since if expediently designed technically it can protect secret key data against unauthorized access. There are constant efforts both to improve the execution speed of cryptographic methods and to protect them against all possible kinds of attacks. The invention is suitable in particular for use in connection with smart cards, but is in no way limited thereto. It is instead implementable in connection with all kinds of cryptographic apparatuses.

In a number of known cryptographic methods it is necessary to perform a modular exponentiation according to the equation $$E = x^d \pmod N = x^d \pmod{p \cdot q} \tag{1}$$

where p and q are prime numbers. An especially important cryptographic method that comprises a modular exponentiation step is the RSA method, known for example from Alfred J. Menezes, Paul C. van Oorschot and Scott A. Vanstone, "Handbook of Applied Cryptography," Boca Raton: CRC Press, 1997, pages 285 to 291. Use of modular exponentiation is not limited to the RSA method, however, but also includes for example Rabin signatures known from Menezes et al., ibid., pages 438 to 442, and the Fiat-Shamir identification scheme known from Menezes et al., ibid., pages 408 to 410.

The security of cryptographic methods that include modular exponentiation is regularly dependent on the difficulty of factorizing the number N from equation (1) into its prime factors p and q. This problem is only of sufficient complexity for large values N, so that N should be chosen as great as possible, on the one hand. The computing effort for calculating values by means of modular exponentiation according to equation (1) increases monotonically with the magnitude of N, on the other hand, so that it would be desirable from the point of view of practical applicability to be able to restrict the computation time required to acceptable values despite large values of N.

It is known to increase the computation speed by a factor of four by applying the so-called "Chinese Remainder Theorem," which permits for example larger values N at equal computation time. Instead of evaluating equation (1) directly, a transformation is performed according to $$E = x^d \pmod{p \cdot q} = aE_1 + bE_2 \pmod N \tag{2}$$

where $$E_1 = x^d \pmod p \tag{3}$$

$$E_2 = x^d \pmod q \tag{4}$$

One consequence of applying the Chinese Remainder Theorem is that the modular exponentiation is no longer done modulo N, i.e. modulo that number concealing its own prime factorization, but successively in a first partial step modulo p and a second partial step modulo q, i.e. knowledge of the prime factorization n=p·q to be kept secret is presupposed in this computing rule and leads to division of the total computing process into a first computing step (3) essentially involving the first prime factor, and a second computing step (4) essentially involving the second prime factor. The advantage is that exponent d in equation (1) must be defined modulo $\phi(p \cdot q)$, whereas the exponents in equation (2) must only be defined modulo $\phi(p)$ or $\phi(q)$, where $\phi$ denotes the Eulerian function.

Interestingly, an attack scheme on such cryptographic methods using modular exponentiation has recently become known by which the information on the prime factorization of N can be recovered from the faulty result of a disturbed modular exponentiation by suitable artificial intrusions in the otherwise undisturbed computing sequence, provided the concrete implementation makes use of the Chinese Remainder Theorem according to equations (2) to (4). This attempt known as the "Bellcore attack" is described for example in Dan Boneh, Richard A. DeMillo and Richard J. Lipton: "On the importance of checking cryptographic protocols for faults," Advances in Cryptology—EUROCRYPT, 97, Lecture Notes in Computer Science 1233, Berlin: Springer, 1997. An encryption device is manipulated by physical intrusions such as increasing clock speed, operating voltage or irradiation so that computing errors occur in the execution of the modular exponentiation according to the Chinese Remainder Theorem with a certain, not too great probability. If a computing error occurs only in one of the two terms in equation (2), the two prime factors p and q can be reconstructed from the erroneous exponentiation result.

The consequence to be drawn from this vulnerability of modular exponentiation implemented by means of the Chinese Remainder Theorem is to first check the result of the computing operation for correctness before it is processed further, particularly before it is outputted in some form, e.g. in the form of a signature.

A trivial countermeasure for the "Bellcore attack" is to effect this correctness check by repeating the computing operation at least once. In case of random computing errors it can be assumed that the result of the first computing operation deviates from that of the check computing operations. The essential disadvantage of this approach is that the computation time is already doubled by one check calculation.

The print WO-A1-98/52319 discloses in particular a method for protecting computing operations executing modular exponentiation according to the Chinese Remainder Theorem against the "Bellcore attack." A secret integer j is selected for example in the range of $[0, 2^k-1]$ with $16 \leq k \leq 32$. Then the following expressions are calculated:

$$v_1 = x \pmod{j \cdot q} \tag{5}$$

$$v_2 = x \pmod{j \cdot q} \tag{6}$$

$$d_1 = d \pmod{\phi(j \cdot p)} \tag{7}$$

$$d_2 = d \pmod{\phi(j \cdot q)} \tag{8}$$

$$w_1 = v_1^{d_1} \pmod{j \cdot p} \tag{9}$$

$$w_2 = v_2^{d_2} \pmod{j \cdot q} \tag{10}$$

Then it is checked whether it holds that:

$$w_1 = w_2 \pmod j \tag{11}$$

If expression (11) can be verified, the following expressions are calculated in the known method:

$$y_1 = w_1 \pmod p \tag{12}$$

$$y_2 = w_2 (\bmod\ q) \quad (13)$$

from which the value for $$E = x^d (\bmod\ N) \quad (14)$$

can then be determined by means of the Chinese Remainder Theorem.

This known method has the advantage over simple check computing operations that the additional computation time required is substantially lower.

In this method, both prime numbers p and q must be multiplied by the same factor d. The print WO-A1-98/52319 describes a second method that permits prime numbers p and q to be multiplied by different factors r and s. However, two further exponentiations are possible for the check calculation.

The problem of the invention is to provide a cryptographic method and apparatus that save computing operations or computation time while retaining or increasing the security.

This problem is solved according to the invention by a cryptographic method with the features stated in claim 1 or 2 and by a cryptographic apparatus with the features stated in claim 13 or 14.

Dependent claims 3 to 12 and 15 to 24 show advantageous developments.

As mentioned below, it is advantageous on certain arithmetic and logic units if a modulus in the modular exponentiation has many leading binary ones, so that different factors r and s signify a certain advantage here. Further, there are arithmetic and logic units optimized for modular exponentiation, but the mere data transfer from the central processing unit to the optimized arithmetic and logic unit for exponentiation causes considerable overhead. The present invention saves one exponentiation compared to the above-described method with different factors r and s.

According to the invention, two integers r and s are selected for example in the range of $[0, 2^k-1]$ with $16 \leq k \leq 32$, so that d is relatively prime to $\phi(kgV(r,s))$, where $kgV(r,s)$ is the smallest common multiple of r and s and $\phi(\ )$ is the Eulerian function. Then the following expressions are calculated:

$$x_1 = x (\bmod\ p \cdot r) \quad (15)$$

$$x_2 = x (\bmod\ q \cdot s) \quad (16)$$

$$d\_1 = d (\bmod\ \phi(p \cdot r)) \quad (15)$$

$$d\_2 = d (\bmod\ \phi(q \cdot s)) \quad (16)$$

$$z_1 = x_1^{d\_1} (\bmod\ p \cdot r) \quad (15)$$

$$z_2 = x_2^{d\_2} (\bmod\ q \cdot s) \quad (16)$$

Now $z_1 = x^d (\bmod\ p \cdot r)$ and $z_2 = x^d (\bmod\ q \cdot s)$ hold. According to the Chinese Remainder Theorem a number z can easily be calculated from $z_1$ and $z_2$ with $$z = z_1 (\bmod\ p \cdot r); z = z_2 (\bmod\ q \cdot s); z = x^d (\bmod\ p \cdot q \cdot kgV(r,s)) \quad (1)$$

The numbers r and s must according to the invention be chosen so that d is relatively prime to $\phi(kgV(r,s))$. Under these circumstances the Extended Euclidean Algorithm can be used to easily find a natural number e with $$e \cdot d = 1 (\bmod\ \phi(kgV(r,s))) \quad (18)$$

With the aid of Z and e the number C is calculated as follows:

$$C = z^e (\bmod\ kgV(r,s)) \quad (19)$$

According to Euler's theorem the following holds:

$$C = x^{d \cdot e} = x (\bmod\ kgV(r,s)) \quad (20)$$

By comparison of the two values C and x modulo $kgV(r,s)$ an error can be ascertained with high probability. If $C \neq x (\bmod\ kgV(r)s))$ is ascertained, the result of the modular exponentiation is to be regarded as erroneous and rejected.

In RSA methods (as also in the Rabin signature scheme) a modular exponentiation is to be performed for generating a digital signature or for decryption, whereby the modulus $p \cdot q$ and exponent d only depend on the private key. Consequently the numbers d, e, r and s can be calculated once upon integration of the private key and stored for re-use.

In a variant of the invention, two integers r and s are likewise selected for example in the range of $[0, 2^k-1]$ with $16 \leq k \leq 32$. On a binary arithmetic and logic unit it is recommended that numbers r and s are both odd. Furthermore, two fixed numbers $b_1$ and $b_2$ are chosen not dependent on x in the interval $[1, \ldots, r-1]$ and $[1, \ldots, s-1]$ and relatively prime to r and s, respectively. If r and s are not relatively prime, $b_1$ and $b_2$ must and $b_2$ must fulfill the additional condition $b_1 = b_2 (\bmod\ ggT(r,s))$, where $ggT(r,s)$ designates the greatest common divisor of r and s.

According to the Chinese Remainder Theorem, a number $x_1$ is first calculated with $$x_1 = x (\bmod\ p), x_1 = b_1 (\bmod\ r) \quad (21)$$

A number $x_2$ is likewise calculated with $$x_2 = x (\bmod\ q), x_2 = b_2 (\bmod\ s) \quad (22)$$

Then the following expressions are calculated:

$$d\_1 = d (\bmod\ \phi(p)) \quad (23)$$

$$d\_2 = d (\bmod\ \phi(q)) \quad (24)$$

$$z_1 = x_1^{d\_1} (\bmod\ p \cdot r) \quad (25)$$

$$z_2 = x_2^{d\_2} (\bmod\ q \cdot s) \quad (26)$$

$$C_1 = b_1^{d\_1} (\bmod\ r) \quad (27)$$

$$C_2 = b_2^{d\_2} (\bmod\ s) \quad (28)$$

To save computation time, exponents $d\_1$ and $d\_2$ in (27) and (28) can be reduced before carrying out the exponentiation modulo $\phi(r)$ and $\phi(s)$, respectively.

It follows from (23) and (25) that $$z_1 = x^d (\bmod\ p) \quad (29)$$

It follows from (24) and (26) that $$z_2 = x^d (\bmod\ q) \quad (30)$$

According to the Chinese Remainder Theorem a number z can easily be calculated from $z_1$ and $z_2$ with $$z = z_1 (\bmod\ p \cdot r); z = z_2 (\bmod\ q \cdot s); \quad (31)$$

Even if r and s are not relatively prime, such a number z exists because $z_1 = C_1 = b_1^{d\_1} = b_2^{d\_2} = C_2 = z_2 (\bmod\ ggT(r,s))$. Since p and q are relatively prime, it follows from (29), (30) and (31) that:

$$z = x^d (\bmod\ p \cdot q) \quad (32)$$

so that the sought number z can easily be determined from the values calculated above.

It follows from (21), (25) and (27) that $$z_1 = C_1 \pmod{r} \quad (33)$$

It follows from (22), (26) and (28) that $$z_2 = C_2 \pmod{s} \quad (34)$$

By checking conditions (33) and (34) an error can be ascertained with high probability. If one of conditions (33) or (34) is violated, the result of the modular exponentiation is to be regarded as erroneous and rejected.

In contrast to the method in claim 8 of the print WO-A1-98/52319, numbers $b_1$ and $b_2$ are not dependent on base x in the variant of the method presented here. When applying the RSA method or Rabin signature scheme a private key is typically integrated into a cryptographic device, e.g. smart card, once and then used several times. In the modular exponentiation applied in these methods, exponent d and modulus p·q are fixed elements of the private key. Consequently, values $C_1$ and $C_2$ must only be calculated once upon integration of the key in the cryptographic device, and can then be stored in the device. Storing these values saves two modular exponentiations over the method presented in the print WO-A1-98/52319.

A cryptographic apparatus, for example smart card, with additional hardware for accelerating the modular arithmetic contains fast adding and/or multiplying units in usual embodiments, while the division by a long number required in modular reduction must be performed by usual standard methods, as known for example from Donald Knuth: "The Art of Computer Programming," Volume 2: Seminumerical Algorithms, 2nd Ed., Addison-Wesley, 1981. One of several known methods for simplifying the division operation is to multiply modulus p by number r before exponentiation so that the binary representation of product p·r contains as many ones as possible; see for example Menezes et al., ibid., pages 598 to 599. Division by a number with as many leading ones as possible is considerably simpler than division by a general number.

Multiplier r is chosen according to the invention so that d is relatively prime to $\phi(r)$. In the abovementioned variant of the invention, this relative primeness is not required. For each modulus p there is optimal multiplier $r_{opt}$ dependent on the particular technical implementation of the division. If the chosen value of r is slightly smaller smaller than the optimum, product p·r still contains enough leading ones to permit the division to be done simply. With high probability, number d is relatively prime to at least one of the values $\phi(r_{opt}-i)$, where i=1, ..., k, where k is a small number dependent on the implementation.

If this is not the case, let r be replaced by $2^i \cdot r$ where $2^i$ is a suitable power of two dependent on the implementation.

The same substitutions are accordingly also applicable to second prime factor q. Since multipliers r (for p) and s (for q) can be chosen independently of each other, a corresponding choice is likewise possible for multiplier s.

The invention claimed is:

1. A cryptographic method in which computation time to perform modular exponentiation is reduced when carrying out an encryption and signature scheme by means of an electronic apparatus, and in which recovery of information on prime factorization based on a faulty result of a disturbed modular exponentiation is prevented, comprising the steps of:
   a) using said electronic apparatus to perform at least one computing step containing a modular exponentiation E $$E = x^d \pmod{p \cdot q}$$

with a first prime factor p, a second prime factor q, an exponent d and a base x, wherein
   b) for carrying out the modular exponentiation two natural numbers r and s are chosen with the condition that d is relatively prime to $\phi(kgV(r,s))$, and wherein the following computing steps are performed:

$$x_1 = x \pmod{p \cdot r}$$

$$x_2 = x \pmod{q \cdot s}$$

$$d\_1 = d \pmod{\phi(p \cdot r)}$$

$$d\_2 = d \pmod{\phi(q \cdot s)}$$

$$z_1 = x_1^{d\_1} \pmod{p \cdot r}$$

$$z_2 = x_2^{d\_2} \pmod{q \cdot s}$$

and wherein $\phi(.)$ is the Eulerian function and $kgV(r,s)$ is the smallest common multiple of r and s,
   c) then a number z is calculated according to the Chinese Remainder Theorem from $z_1$ and $z_2$ with $z \equiv z_1 \pmod{p \cdot r}$; $z \equiv z_2 \pmod{q \cdot s}$;
   d) the result E of the exponentiation is calculated by reduction of z modulo p·q,
   e) the previously calculated number z and thus the result E is checked for computing errors in a checking step,
   f) the checking step comprises the following computing operations:
   f1) calculating the smallest possible natural number e with the property $e \cdot d = 1 \pmod{\phi(kgV(r,s))}$ with the aid of the Extended Euclidean Algorithm,
   f2) calculating the value $C = z^e \pmod{kgV(r,s)}$,
   f3) comparing the values x and C modulo $kgV(r,s)$, and rejecting the result of the modular exponentiation E as faulty if $x \neq C \pmod{kgV(r,s)}$, and
   f4) if $x = C \pmod{kgV(r,s)}$, using the modular exponentiation to complete said encryption and signature scheme.

2. A cryptographic method in which computation time to perform modular exponentiation is reduced when carrying out an encryption and signature scheme by means of an electronic apparatus, and in which recovery of information on prime factorization based on a faulty result of a disturbed modular exponentiation is prevented, comprising the steps of:
   a) using said electronic apparatus to perform at least one computing step containing a modular exponentiation E $$E = x^d \pmod{p \cdot q}$$

with a first prime factor p, a second prime factor q, an exponent d and a base x, wherein
   b) for carrying out the modular exponentiation two natural numbers r and s, and two numbers $b_1$ and $b_2$ in the interval [1, ..., r−1] and [1, ..., s−1] and relatively prime to r and s, respectively, are chosen, and wherein $b_1$ and $b_2$ fulfill the condition $b_1 = b_2 \pmod{ggT(r,s)}$, where $ggT(r,s)$ designates the greatest common divisor of r and s,
   c) the two numbers $b_1$ and $b_2$ are used to calculate according to the Chinese Remainder Theorem values $x_1$ and $x_2$ fulfilling the following conditions:

$$x_1 = x \pmod{p}, \, x_1 = b_1 \pmod{r}$$

$$x_2 = x \pmod{q}, \, x_2 = b_2 \pmod{s}$$

and then the following computing steps are performed:

$$d\_1 = d(\bmod \phi(p))$$

$$d\_2 = d(\bmod \phi(q))$$

$$z_1 = x_1^{d\_1}(\bmod p \cdot r)$$

$$z_2 = x_2^{d\_2}(\bmod q \cdot s)$$

and $\phi(.)$ represents the Eulerian function and kgV(r,s) the smallest common multiple of r and s, d) then a number z is calculated from $z_1$ and $z_2$ according to the Chinese Remainder Theorem with $z = z_1 (\bmod p \cdot r)$; $z = z_2 (\bmod q \cdot s)$;

e) the result E of the exponentiation is calculated by reduction of z modulo p·q, f) the previously calculated number z (and thus automatically also the result E) is checked for computing errors in a checking step, g) the checking step comprises the following computing operations:

g1) calculating the numbers $$C_1 = b_1^{d\_1}(\bmod \cdot r)$$

$$C_2 = b_2^{d\_2}(\bmod \cdot s)$$

whereby d_1 and d_2 are reduced before carrying out the modular exponentiation modulo $\phi(r)$ and $\phi(s)$, respectively, g2) comparing the values $z_1$ and $C_1$ modulo r as well as $z_2$ and $C_2$ modulo s, and rejecting the result of the modular exponentiation E is rejected as faulty if $C_1 \neq z_1$ mod r or $C_2 \neq z_2$ mod s holds, and g3) if $C_1 \neq z_1$ mod r or $C_2 \neq z_2$ mod s holds, using the modular exponentiation to complete said encryption and signature scheme.

3. The cryptographic method according to claim 2, wherein the numbers r and s are odd.

4. The cryptographic method according to claims 1 or 2, wherein the numbers r and s are selected in the range of [0, $2^k-1$] with $16 \leq k \leq 32$.

5. The cryptographic method according to claims 1 or 2, wherein at least one of the numbers r and s is chosen so that the binary representation of the product p·r or q·s contains as many leading ones as possible.

6. The cryptographic method according to claims 1 or 2, wherein both numbers r and s are chosen so that the binary representation of the product p·r and the product q·s contain as many leading ones as possible.

7. The cryptographic method according to claim 5, wherein a) in a first partial step, corresponding optimal numbers $r_{opt}$ and $s_{opt}$ are first selected for at least one of the numbers r and s, respectively, without limitation by the condition that d is relatively prime to $\phi(kgV(r,s))$, and b) in a second partial step, adjacent values $r = r_{opt} - I$ and $s = s_{opt} - I$, $I = 0, 1, \ldots, k$, are selected so that d is relatively prime to $\phi(kgV(r,s))$.

8. The cryptographic method according to claim 5, wherein a) in a first partial step, corresponding optimal numbers $r_{opt}$ and $s_{opt}$ are selected for each of the numbers r and s, respectively, without limitation by the condition that d is relatively prime to $\phi(kgV(r,s))$, and b) in a second partial step, values $r = 2^l \cdot r_{opt}$ and $s = 2^l \cdot s_{opt}$, $l = 0, 1, \ldots, j$, are selected so that d is relatively prime to $\phi(kgV(r,s))$.

9. The cryptographic method according to claim 5, wherein a) in a first partial step, at least one of the numbers $r_{opt}$ and $s_{opt}$ is first selected without limitation by the condition that d is relatively prime to $\phi(kgV(r,s))$, b) in a second partial step, adjacent values $r = r_{opt} - I$ and $s = s_{opt} - I$, $I = 0, 1, \ldots, k$, are selected so that d is relatively prime to $\phi(kgV(r,s))$ if such a value exists for $I = 0, 1, \ldots k$, and c) in a third partial step, values $r = 2^l \cdot r_{opt}$ and $s = 2^l \cdot s_{opt}$, $I = 0, 1, \ldots, j$, are selected so that d is relatively prime to $\phi(kgV(r,s))$ if no value was selected in the second partial step.

10. The cryptographic method according to claim 1, wherein it comprises the RSA method.

11. The cryptographic method according to claim 1, wherein it comprises the Rabin signature scheme.

12. The cryptographic method according to claim 1, wherein it comprises the Fiat-Shamir identification scheme.

13. A cryptographic apparatus for carrying out an encryption and signature scheme, said apparatus being arranged to reduce computation time to perform modular exponentiation when carrying out an encryption and signature scheme while also preventing recovery of information on prime factorization based on a faulty result of a disturbed modular exponentiation, said apparatus:

a) performing at least one computing step containing a modular exponentiation E $$E = x^d (\bmod p \cdot q)$$

with a first prime factor p, a second prime factor q, an exponent d and a base x, wherein b) for carrying out the modular exponentiation two natural numbers r and s are chosen with the condition that d is relatively prime to $\phi(kgV(r,s))$, and wherein the following computing steps are performed:

$$x_1 = x(\bmod p \cdot r)$$

$$x_2 = x(\bmod q \cdot s)$$

$$d\_1 = d(\bmod \phi(p \cdot r))$$

$$d\_2 = d(\bmod \phi(q \cdot s))$$

$$z_1 = x_1^{d\_1}(\bmod p \cdot r)$$

$$z_2 = x_2^{d\_2}(\bmod q \cdot s)$$

and wherein $\phi(.)$ is the Eulerian function and kgV(r,s) is the smallest common r and s, c) then a number z is calculated from $z_1$ and $z_2$ according to the Chinese Remainder Theorem with $z = z_1 (\bmod p \cdot r)$; $z = z_2 (\bmod q \cdot s)$;

d) the result E of the exponentiation is calculated by reduction of z modulo p·q, e) the previously calculated number z (and thus automatically also the result E) is checked for computing errors in a checking step, f) the checking step comprises the following computing operations:

f1) calculating the smallest possible natural number e with the property $e \cdot d = 1(\bmod \phi kgV(r,s))$ with the aid of the Extended Euclidean Algorithm, f2) calculating the value $C = z^e (\bmod kgV(r,s))$, f3) comparing the values x and C modulo kgV(r,s), and rejecting the result of the modular exponentiation E as faulty if $x \neq C \pmod{kgV(r,s)}$, and f4) if $x = C \pmod{kgV(r,s)}$ using the modular exponentiation to complete said encryption and signature scheme.

14. A cryptographic apparatus for carrying out an encryption and signature scheme, said apparatus being arranged to reduce computation time to perform modular exponentiation when carrying out an encryption and signature scheme while also preventing recovery of information on prime factorization based on a faulty result of a disturbed modular exponentiation, said apparatus:

a) performing at least one computing step containing a modular exponentiation E $$E = x^d (\mathrm{mod}\ p \cdot q)$$

with a first prime factor p, a second prime factor q, an exponent d and a base x, wherein b) for carrying out the modular exponentiation two natural numbers r and s, and two numbers $b_1$ and $b_2$ in the interval [1, ..., r−1] and [1, ..., s−1] and relatively prime to r and s, respectively, are chosen, and wherein $b_1$ and $b_2$ fulfill the condition $b_1 = b_2 (\mathrm{mod}\ \mathrm{ggT}(r,s))$, where ggT(r,s) designates the greatest common divisor of r and s, c) the two numbers $b_1$ and $b_2$ are used to calculate according to the Chinese Remainder Theorem values $x_1$ and $x_2$ fulfilling the following conditions:

$$x_1 = x (\mathrm{mod}\ p),\ x_1 = b_1 (\mathrm{mod}\ r)$$

$$x_2 = x (\mathrm{mod}\ q),\ x_2 b_2 (\mathrm{mod}\ s)$$

and then the following computing steps are performed:

$$d\_1 = d (\mathrm{mod}\ \phi(p))$$

$$d\_2 = d (\mathrm{mod}\ \phi(q))$$

$$z_1 = x_1^{d\_1} (\mathrm{mod}\ p \cdot r)$$

$$z_2 = x_2^{d\_2} (\mathrm{mod}\ q \cdot s)$$

and wherein $\phi(.)$ represents the Eulerian function and kgV(r,s) the smallest common multiple of r and s, d) then a number z is calculated from $z_1$ and $z_2$ according to the Chinese Remainder Theorem with $z = z_1 (\mathrm{mod}\ p \cdot r)$; $z = z_2 (\mathrm{mod}\ q \cdot s)$;

e) the result E of the exponentiation is calculated by reduction of z modulo p·q, f) the previously calculated number z (and thus automatically also the result E) is checked for computing errors in a checking step, g) the checking step comprises the following computing operations:

g1) calculating the numbers $$C_1 = b_1^{d\_1} (\mathrm{mod} \cdot r)$$

$$C_2 = b_2^{d\_2} (\mathrm{mod} \cdot s)$$

wherein d_1 and d_2 are reduced before carrying out the modular exponentiation modulo $\phi(r)$ and $\phi(s)$, respectively, g2) comparing the values $z_1$ and $C_1$ modulo r as well as $z_2$ and $C_2$ modulo s, and rejecting the result of the modular exponentiation E as faulty if $C_1 \ne z_1$ mod r or $C_2 \ne z_2$ mod s holds, and g3) if $C_1 \ne z_1$ mod r or $C_2 \ne z_2$ mod s holds, using the modular exponentiation to complete said encryption and signature scheme.

15. The cryptographic apparatus according to claim 14, wherein the numbers r and s are odd.

16. The cryptographic apparatus according to claims 13 or 14, wherein the numbers r and s are selected in the range of [0, $2^k$−1] with $16 \le k \le 32$.

17. The cryptographic apparatus according to claims 13 or 14, wherein to 16, characterized in that at least one of the numbers r and s is chosen so that the binary representation of the product p·r or q·s contains as many leading ones as possible.

18. The cryptographic apparatus according to claims 13 or 14, wherein both numbers r and s are chosen so that the binary representation of the product p·r and the product q·s contain as many leading ones as possible.

19. The cryptographic apparatus according to claim 17, wherein a) in a first partial step, corresponding optimal numbers $r_{opt}$ and $s_{opt}$ are first selected for at least one of the numbers r and s, respectively, without limitation by the condition that d is relatively prime to $\phi\mathrm{kgV}(r,s)$, and b) in a second partial step, adjacent values $r = r_{opt} - i$ and $s = s_{opt} - i$, i=0, 1, ..., k, are selected so that d is relatively prime to $\phi(\mathrm{kgV}(r,s))$.

20. The cryptographic apparatus according to claim 17, wherein a) in a first partial step, corresponding optimal numbers $r_{opt}$ and $s_{opt}$ are selected for each of the numbers r and s, respectively, without limitation by the condition that d is relatively prime to $\phi(\mathrm{kgV}(r,s))$, and b) in a second partial step, values $r = 2^l \cdot r_{opt}$ and $s = 2^l \cdot s_{opt}$, l=0, 1, ..., j, are selected so that d is relatively prime to $\phi\mathrm{kgV}(r,s)$.

21. The cryptographic apparatus according to claim 17, wherein a) in a first partial step, at least one of the numbers $r_{opt}$ and $s_{opt}$ is first selected without limitation by the condition that d is relatively prime to $\phi(\mathrm{kgV}(r,s))$, b) in a second partial step, adjacent values $r = r_{opt} - i$ and $s = s_{opt} - i$, i=0, 1, ..., k, are selected so that d is relatively prime to $\phi(\mathrm{kgV}(r,s))$ if such a value exists for i=0, 1, ..., k, and c) in a third partial step, values $r = 2^l \cdot r_{opt}$ and $s = 2^l \cdot s_{opt}$, i=0, 1, ..., j, are selected so that d is relatively prime to $\phi(\mathrm{kgV}(r,s))$ if no value was selected in the second partial step.

22. The cryptographic apparatus according to claim 13, wherein it comprises the RSA method.

23. The cryptographic apparatus according to claim 13, wherein it comprises the Rabin signature scheme.

24. The cryptographic apparatus according to claim 13, wherein it comprises the Fiat-Shamir identification scheme.

* * * * *